(12) United States Patent
Lee et al.

(10) Patent No.: US 9,285,941 B2
(45) Date of Patent: Mar. 15, 2016

(54) LIQUID CRYSTAL DISPLAY

(71) Applicant: Samsung Display Co., Ltd., Yongin (KR)

(72) Inventors: Kyung Mo Lee, Seoul (KR); Yeun Mo Yeon, Asan-si (KR); Jin Se Kim, Gwangmyeong-si (KR); Myoung-Ha Jeon, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 154 days.

(21) Appl. No.: 14/039,725

(22) Filed: Sep. 27, 2013

(65) Prior Publication Data

US 2014/0333519 A1 Nov. 13, 2014

(30) Foreign Application Priority Data

May 8, 2013 (KR) .......................... 10-2013-0052024

(51) Int. Cl.
*G06F 3/046* (2006.01)

(52) U.S. Cl.
CPC ...................................... *G06F 3/046* (2013.01)

(58) Field of Classification Search
CPC .................................................. G09G 3/3648
USPC ......................................................... 345/102
See application file for complete search history.

(56) References Cited

U.S. PATENT DOCUMENTS

| | | | |
|---|---|---|---|
| 7,002,644 B2 | 2/2006 | You et al. | |
| 7,012,655 B2 | 3/2006 | You et al. | |
| 7,414,680 B2 | 8/2008 | Lee et al. | |
| 7,436,481 B2 | 10/2008 | You et al. | |
| 8,164,583 B2 | 4/2012 | Hatakeyama | |
| 2004/0125312 A1* | 7/2004 | You et al. | 349/149 |
| 2006/0146034 A1* | 7/2006 | Chen et al. | 345/173 |
| 2007/0030242 A1* | 2/2007 | Ito | 345/102 |
| 2010/0033447 A1* | 2/2010 | Horie | 345/174 |

FOREIGN PATENT DOCUMENTS

| | | |
|---|---|---|
| JP | 2006-243428 | 9/2006 |
| KR | 10-2005-0075214 | 7/2005 |
| KR | 10-2006-0022118 | 3/2006 |
| KR | 10-2012-0079598 | 7/2012 |

* cited by examiner

*Primary Examiner* — Sahlu Okebato
(74) *Attorney, Agent, or Firm* — H.C. Park & Associates, PLC (57) ABSTRACT

A liquid crystal display includes a liquid crystal panel, a backlight assembly, and a digitizer module. The liquid crystal panel is configured to display an image. The backlight assembly includes: a light emitting diode configured to provide light to the liquid crystal panel; and a light guide configured to guide the light from the light emitting diode towards the liquid crystal panel. The digitizer module includes: a sensor board and a supporting substrate configured to support the sensor board. The backlight assembly is disposed between the liquid crystal panel and the supporting substrate. A size of the supporting substrate is greater than a size of the sensor board. The light emitting diode and the sensor board are disposed on the supporting substrate.

19 Claims, 7 Drawing Sheets

LIQUID CRYSTAL DISPLAY

CROSS-REFERENCE TO RELATED APPLICATION

This application claims priority from and the benefit of Korean Patent Application No. 10-2013-0052024, filed on May 8, 2013, which is incorporated by reference for all purposes as if set forth herein.

BACKGROUND

1. Field

Exemplary embodiments relate to display technology, and, more particularly, to liquid crystal displays.

2. Discussion

Conventional liquid crystal displays typically include two display panels on which field generating electrodes, such as pixel electrodes and common electrodes, are formed and a liquid crystal layer disposed therebetween. To facilitate the display of images, these liquid crystal displays usually apply voltage to the field generating electrodes to generate an electric field in the liquid crystal layer to control the directionality of liquid crystal molecules of the liquid crystal layer, and, thereby, the polarization of incident light propagating therethrough.

Traditional liquid crystal displays may also operate in association with a digitizer, which enables interactions (e.g., touches) on and/or near a displayed screen to be detected for the input of an electrical graphic signal. Digitizers may be generally classified into different types, such as, for example, a resistive type, a capacitive type, and an electromagnetic type, in accordance with a method of detecting interactions.

Resistive type digitizers are typically configured to detect a position of interaction based on a pressure of the interaction, and, thereby, based on a change in an amount of current in a state where a direct current voltage is applied. Capacitive type digitizers usually detect a position of interaction using a capacitance coupling at a point where an alternating current voltage is applied. Further, electromagnetic type digitizers typically use a digitizer sensor board including a plurality of coils. In this manner, if a user moves, for example, an interaction tool (e.g., a pen, stylus, etc.), and the interaction tool is driven by an alternating current signal to generate a vibrating magnetic field, this vibrating magnetic field may induce a signal upon a coil. In this manner, the induced signal may be detected to detect a position of interaction.

Typically, digitizers of the electromagnetic type are provided on a rear surface of a display device. In this manner, the electromagnetic digitizer may be disposed on a bottom chassis of the display device. As electronic device design focus on slimming down the features of display devices and devices incorporating display devices, an increasing amount of focus is placed upon slimming down the thicknesses of features associated with the display device, such as slimming down a thickness of a liquid crystal display device. As such, being able to reduce the thickness of a liquid crystal display including a digitizer is of interest.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a display device with reduced thickness that includes a digitizer module.

Additional aspects will be set forth in the detailed description which follows and, in part, will be apparent from the disclosure, or may be learned by practice of the invention.

According to exemplary embodiments, a liquid crystal display includes a liquid crystal panel, a backlight assembly, and a digitizer module. The liquid crystal panel is configured to display an image. The backlight assembly includes: a light emitting diode configured to provide light to the liquid crystal panel; and a light guide plate configured to guide the light from the light emitting diode towards the liquid crystal panel. The digitizer module includes a sensor board and a supporting substrate configured to support the sensor board. The backlight assembly is disposed between the liquid crystal panel and the supporting substrate. A size of the supporting substrate is greater than a size of the sensor board. The light emitting diode and the sensor board are disposed on the supporting substrate.

According to exemplary embodiments, a display device includes a top chassis, a mold frame, a display panel, and a digitizer module. The display panel is configured to display an image. The display panel is vertically disposed between the mold frame and the top chassis. The digitizer module includes: a sensor board configured to detect electromagnetic changes caused, at least in part, by encroachment of a resonance circuit; and a supporting substrate configured to support the sensor board. The display panel is vertically disposed between the supporting substrate and the top chassis. The mold frame is configured to: support at least a portion of the digitizer module therein; and interface with the top chassis. The mold frame is horizontally disposed between the top chassis and the digitizer module.

According to exemplary embodiments, the supporting substrate of the digitizer module is configured to support at least one light emitting diode (LED) and the mold frame, such that the bottom chassis of a conventional display device is not required. This may serve to reduce the overall thickness of an associated display device including the digitizer module.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although exemplary embodiments are described in association with liquid crystal display (LCD) devices, it is contemplated that exemplary embodiments may be utilized in association with other or equivalent display devices, such as various self-emissive and/or non-self-emissive display technologies. For instance, self-emissive display devices may include organic light emitting displays (OLED), plasma display panels (PDP), etc., whereas non-self-emissive display devices may include electroluminescent (EL) displays, electrophoretic displays (EPD), electrowetting displays (EWD), etc.

Figure 1:
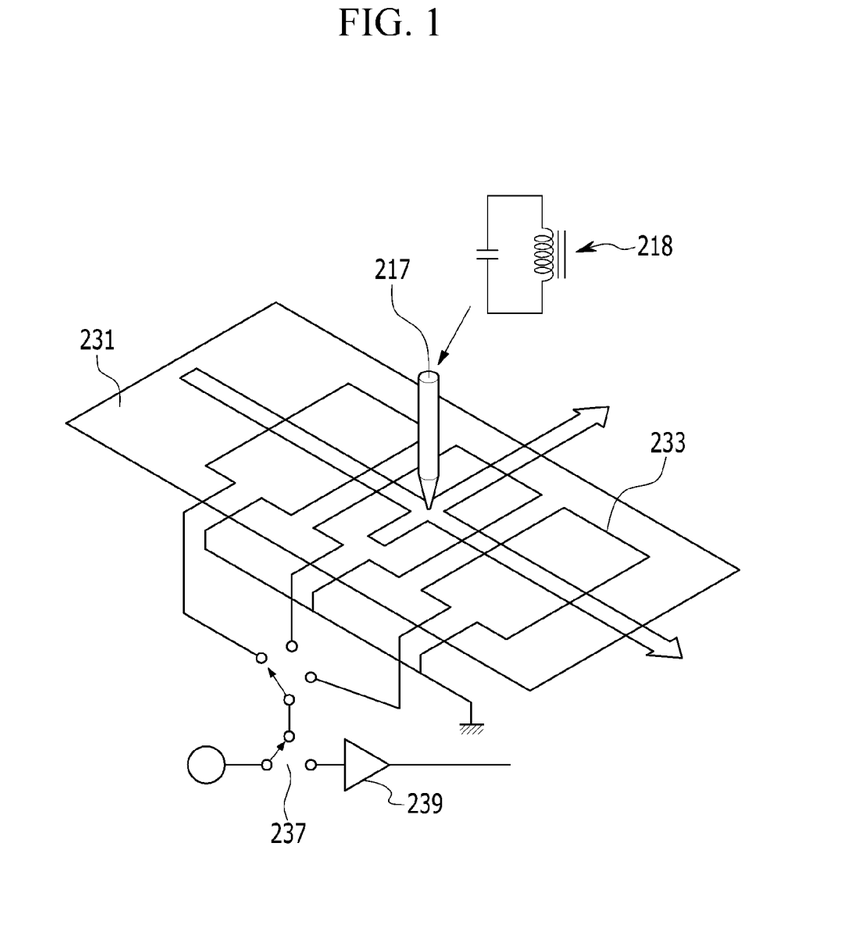
FIG. 1 is a diagram of a schematic operation principle of a general electromagnetic digitizer.

FIG. 1 is a diagram illustrating a schematic operation principle of a general electromagnetic digitizer.

Referring to FIG. 1, an electromagnetic digitizer includes a patterned plurality of antenna coils 233 on a sensor board 231. In this manner, the electromagnetic digitizer is configured to detect a signal generated in a resonance circuit 218 of an interaction tool (e.g., pen, stylus, etc.) 217 to, thereby, detect a position of interaction associated with the interaction tool 217. For the purposes of illustration, the interaction tool 217 will be referred to, hereinafter, as a pen 217. In this manner, the detected signal 237 is enabled to pass through the receiving circuit 239 to recognize the position of the pen 217.

In this manner, the electromagnetic type digitizer includes plural coils 233 disposed on the digitizer substrate 231, and is configured to sense an electromagnetic change caused, at least in part, by an approach of the pen 217 to determine the position of the pen 217. As such, the electromagnetic digitizer may be disposed on the rear side of a display module, unlike conventional resistive type digitizers.

A liquid crystal display including a digitizer module will now be described in more detail in association with FIGS. 2-4.

Figure 2:
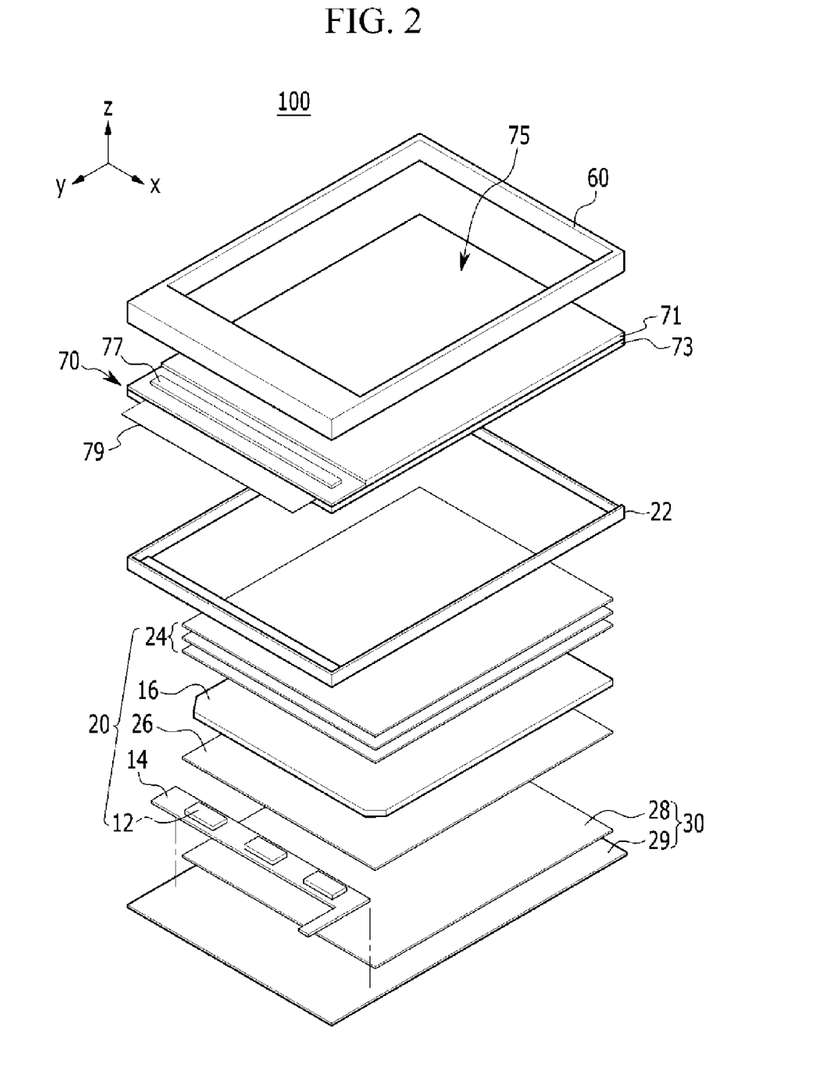
FIG. 2 is an exploded perspective view of a display device including a digitizer module, according to exemplary embodiments.

FIG. 2 is an exploded perspective view of a display device including a digitizer module, according to exemplary embodiments. FIG. 3 is a combined perspective view of the display device of FIG. 2. FIG. 4 is a cross-sectional view of the display device of FIG. 3 taken along sectional line IV-IV. For descriptive purposes, the display device of FIGS. 2-4 is described as a liquid crystal display device, however, as previously mentioned, the display device including the digitizing module may be implemented as one or more other self-emissive or non-self-emissive display devices.

Figure 3:
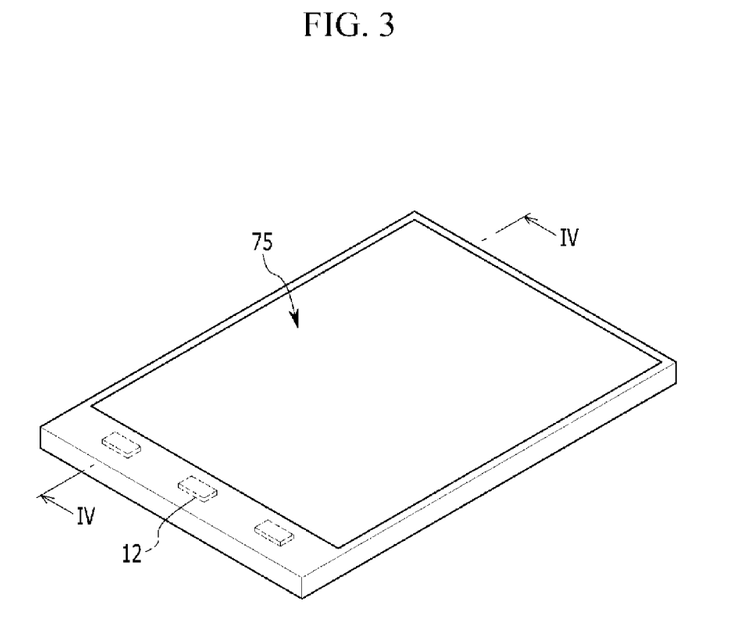
FIG. 3 is a combined perspective view of the display device of FIG. 2, according to exemplary embodiments.
Figure 4:
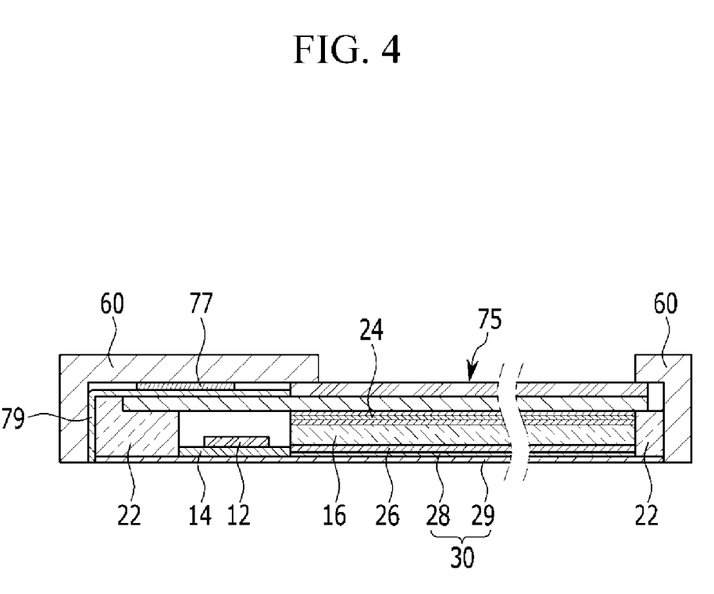
FIG. 4 is a cross-sectional view of the display device of FIG. 3 taken along sectional line IV-IV, according to exemplary embodiments.

Referring to FIGS. 2-4, the liquid crystal display device 100 includes a backlight assembly 20 configured to provide light and a liquid crystal panel assembly 70 configured to receive the light to facilitate the display of an image. The liquid crystal display 100 may further include a top chassis 60 and a mold frame 22, which supports the backlight assembly 20 and the liquid crystal panel assembly 70. To this end, the liquid crystal display device 100 may further includes a digitizer module 30, which may be disposed below the backlight assembly 20. The digitizer module 30 enables interactions (e.g., touches and/or near touches) to a displayed screen to be input and detected as an electrical graphic signal. Further, the liquid crystal display 100 includes a protective window that protects the liquid crystal panel assembly 70 from external impacts and foreign particles. Although specific reference will be made to this implementation, it is also contemplated that the liquid crystal display device 100 may embody many forms and include multiple and/or alternative components. For example, it is contemplated that the components of the liquid crystal display device 100 may be combined, located in separate structures, and/or separate locations.

According to exemplary embodiments, the liquid crystal panel assembly 70 includes a liquid crystal panel 75, an integrated circuit (IC) chip 77, and a flexible printed circuit substrate 79. To this end, the liquid crystal panel 75 includes a thin film transistor array panel 73 including a plurality of thin film transistors (not shown), a color filter display panel 71 disposed on the thin film transistor array panel 73, and liquid crystal (not illustrated) disposed (e.g., injected) between the thin film transistor array panel 73 and the color filter display panel 71.

Polarizers (not illustrated) may be disposed above the color filter display panel 71 (e.g., between the top chassis 60 and the color filter display panel 71) and below the thin film transistor array panel 73 (e.g., between the thin film transistor array panel 73 and the mold frame 22) to polarize light that passes through the liquid crystal panel 75.

As seen in FIG. 2, the IC chip 77 is disposed on the thin film transistor array panel 73. To this end, the IC chip 77 is configured to control the liquid crystal panel 75, e.g., control the directionality of liquid crystal molecules of the liquid crystal disposed between the thin film transistor array panel 73 and the color filter display panel 71.

According to exemplary embodiments, the thin film transistor array panel 73 includes any suitable substrate (e.g., a transparent glass substrate) including thin film transistors (TFT) formed in a matrix formation. It is contemplated, however, that any other suitable arrangement scheme for the TFTs may be utilized. First (e.g., source) terminals of the TFTs may be connected to data lines (not illustrated). Gate terminals of the TFTs may be connected to gate lines (not shown). Second (e.g., drain) terminals may be connected to pixel electrodes (not illustrated). The pixel electrodes may be formed of, for instance, a transparent conductive material, e.g., such as, for instance, polycrystalline aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc.

The data lines and the gate lines of the liquid crystal panel 75 may be connected to the flexible printed circuit substrate 79 so that if an electrical signal is input, the electrical signal may be input to the source terminal and the gate terminal of one or more of the TFTs. In this manner, the TFTs may be "turned on/off" in response to the input of the electrical signal to the gate terminal, and, thereby, are configured to output the electrical signal from the drain terminal.

According to exemplary embodiments, the flexible printed circuit substrate 79 is configured to receives an image signal from, for instance, an external source and apply a driving signal to the data lines and the gate lines to facilitate the display of images via one or more pixels (not shown) of the liquid crystal panel 75. It is noted that the pixels may each include at least one of the aforementioned TFTs.

As seen in FIG. 2, the color filter display panel 71 is disposed on the thin film transistor array panel 73 and, thereby, faces the thin film transistor array panel 73. Although not illustrated, the color filter display panel 71 may include, for instance, a transparent glass substrate, one or more color filters disposed on the substrate, and a common electrode disposed on the surface (e.g., entire surface) of the one or more color filters. The color filters may be configured to facilitate the display of one or more determined colors based on light passing through the color filter(s). To this end, it is noted that the one or more color filters may be formed by a thin film process; however, it is contemplated that any suitable manufacturing process may be utilized. The common electrode may be formed of one or more of the materials utilized to form the pixel electrodes, e.g., AZO, GZO, ITO, IZO, polyaniline, PEDOT:PSS, etc.

According to exemplary embodiments, when power is applied to a gate terminal and a source terminal of a TFT, the TFT may be "turned on" and an electric field may be formed between a pixel electrode of the thin film transistor array panel 73 and a common electrode of the color filter display panel 71. An alignment angle of liquid crystal molecules of the liquid crystal disposed between the thin film transistor array panel 73 and the color filter display panel 71 may be controlled (e.g., changed) according to the electric field. In this manner, light transmittance may be varied in accordance with the alignment angle of the liquid crystal molecules. This may be utilized to facilitate the display of a desired image.

One or more components of or coupled to the flexible printed circuit substrate 79 are configured to generate a data signal and a gate driving signal, which may be utilized to drive the liquid crystal display 100. To this end, the one or more components may also be configured to generate a plurality of timing signals to control the timing of the data and gate driving signals, as well as control the application of the data and gate driving signals to the gate lines and the data lines of the liquid crystal panel 75.

As shown in FIG. 2, the liquid crystal panel assembly is disposed on the backlight assembly 20. In this manner, the backlight assembly 20 is configured to provide light (e.g., uniform light) to the liquid crystal panel 75 to facilitate the display of one or more images. The backlight assembly 20 may be supported by (e.g., fixed to) the mold frame 22. To this end, the backlight assembly 75 may include at least one light emitting diode (LED) 12 configured to provide light to the liquid crystal display panel 75 and a LED power supply substrate 14 configured to provide power to the LED 12.

Further, the backlight assembly 20 may include a light guide plate 16 configured to guide light emitted from the LED 12 to supply the light to the liquid crystal panel 75, a reflective sheet 26 configured to reflect the light provided by the LED 12, and optical sheets 24 configured to supply the light to the liquid crystal panel 75 while maintaining or affecting a luminance characteristic of the light from the LED 12. The light guide plate 16 may be disposed between the reflective sheet 26 and the optical sheets 24. In this manner, the reflective sheet 26 may be utilized to increase the amount of light supplied to the liquid crystal display assembly 70.

As seen in FIG. 2, an upper surface and a lower surface of the mold frame 22 are open to receive a least a portion of the backlight assembly 20 therein. In this manner, the mold frame 22 may be configured to enclose the backlight assembly 20.

According to exemplary embodiments, the backlight assembly 20 may be disposed on the digitizer module 30. In this manner, the reflective sheet 26 may be disposed between the light guide plate 16 and the digitizer module 30. The digitizer module 30 may include a sensor board 28 configured to detect a position of a magnetic field generated in response to an encroachment of the pen in association with an electromagnetic type implementation of the digitizer module 30, as well as include a supporting substrate 29 configured to support the sensor board 28.

In exemplary embodiments, the sensor board 28 is disposed on the supporting substrate 29 and may be formed including a plurality of loop coils. The supporting substrate 29 includes a non-magnetic material, such as aluminum (Al), non-magnetic stainless steel (SUS), etc. The supporting substrate 29 is configured to prevent (or otherwise reduce) electromagnetic interference with an inverter board (not shown) and a signal converting printed circuit board (not illustrated), which may be disposed below the digitizer module 30.

According to exemplary embodiments, a size of the supporting substrate 29 may be larger than the size of the sensor board 28. In this manner, the LED power supply substrate 14 and the mold frame 22 may be disposed on the supporting substrate 29, upon which the sensor board 28 is also disposed. That is, even though a bottom chassis may not be provided, the supporting substrate 29 may be configured to support the LED power supply substrate 14 and the mold frame 22. Further, the supporting substrate 29 may be configured to diffuse heat generated by the LED 12 and transferred to the supporting substrate 29.

A top chassis 60 is disposed above the liquid crystal panel assembly 70 and is configured to protect and support the liquid crystal panel assembly 70. The top chassis 60 may be utilized to bend the flexible printed circuit substrate 79 to the outside of the mold frame 22, as seen in FIG. 4. To this end, the top chassis 60 may be configured to interface with the supporting substrate 29 to, for example, enclose the various components of the liquid crystal display device 100 therebetween. In exemplary embodiments, wherein respective lower surfaces of the top chassis 60, the mold frame 22, and the supporting substrate 29 may be substantially coplanar.

Although not illustrated, the liquid crystal display device 100 may include a touch screen panel disposed above the liquid crystal panel 75. The touch screen panel may be configured to facilitate detection of a capacitive touch pressure. Further, although not illustrated in FIGS. 2-4, an inverter board configured to serve as a power supplying printed circuit board and a signal converting printed circuit board may be disposed on a rear surface of the supporting substrate 29. The inverter board may be configured to transform an external power into a constant voltage level to supply the transformed power to the LED 12. The signal converting printed circuit board may be connected to the flexible printed circuit substrate 79 to convert an analog data signal into a digital data signal to supply the converted signal to the liquid crystal panel 75.

According to exemplary embodiments, the supporting substrate 29 is configured to support the LED power supply substrate 14 and the mold frame 22 so that a bottom chassis is not required. This may enable the reduction in thickness of the liquid crystal display device 100.

Figure 5:
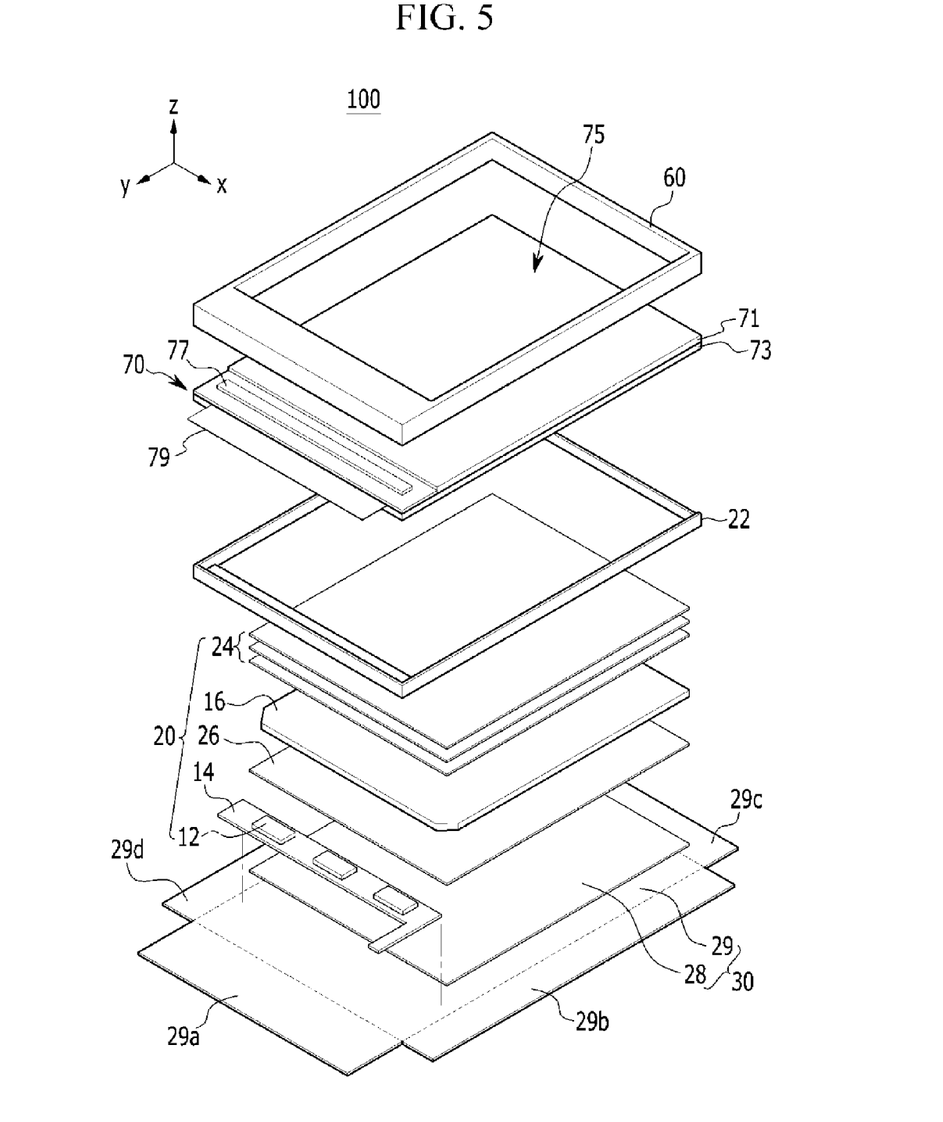
FIG. 5 is an exploded perspective view of a display device including a digitizer module, according to exemplary embodiments.
Figure 6:
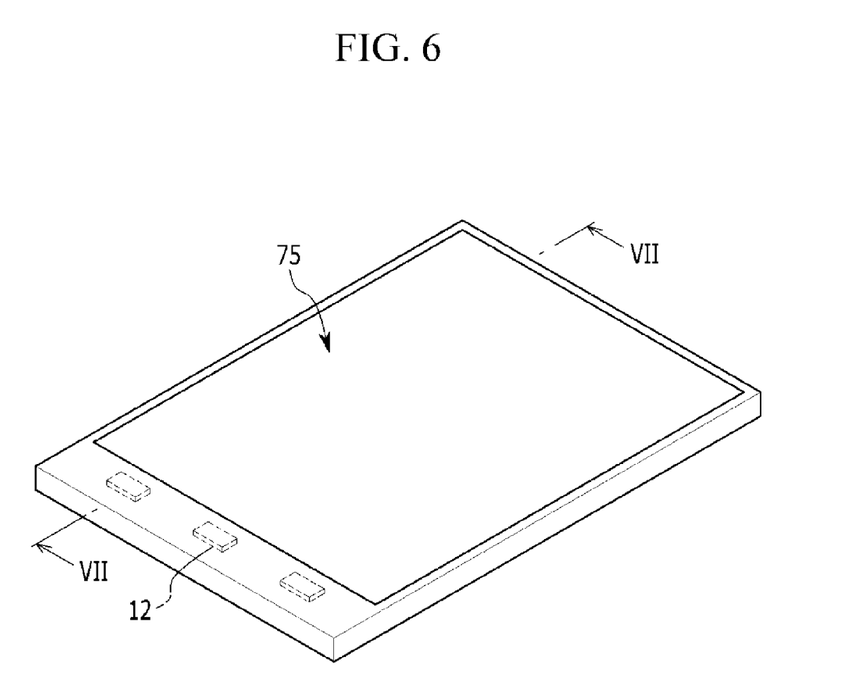
FIG. 6 is a combined perspective view of the display device of FIG. 5, according to exemplary embodiments.
Figure 7:
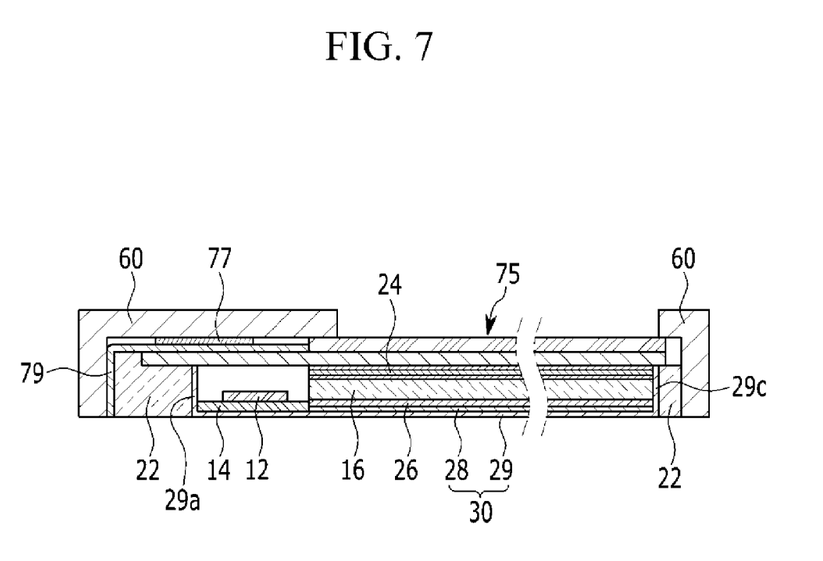
FIG. 7 is a cross-sectional view of the display device of FIG. 6 taken along sectional line VII-VII, according to exemplary embodiments.

FIG. 5 is an exploded perspective view of a display device including a digitizer module, according to exemplary embodiments. FIG. 6 is a combined perspective view of the display device of FIG. 5. FIG. 7 is a cross-sectional view of the display device of FIG. 6 taken along sectional line VII-VII. For descriptive purposes, the display device of FIGS. 2-4 is described as a liquid crystal display device, however, as previously mentioned, the display device including the digitizing module may be implemented as one or more other self-emissive or non-self-emissive display devices. To this end, it is noted that the configuration of the display device of FIGS. 5-7 is substantially the same as the display device of FIGS. 2-4. It is noted, however, that the structure of the digitizer module is different. As such, to avoid obscuring exemplary embodiments described herein, differences are described in more detail below. Brief reference to similar components, however, may be provided for contextual reference.

Referring to FIGS. 5-7, the liquid crystal display device 100 includes a backlight assembly 20, a liquid crystal panel assembly 70, and a top chassis 60 and a mold frame 22 configured to support the backlight assembly 20 and the liquid crystal panel assembly 70. A digitizer module 30 is disposed below the backlight assembly 20. That is, the backlight assembly 20 is disposed between the digitizer module 30 and the top chassis 60.

According to exemplary embodiments, the liquid crystal panel assembly 70 includes a liquid crystal panel 75, an IC chip 77, and a flexible printed circuit substrate 79.

The liquid crystal panel 75 includes a thin film transistor array panel 73, a color filter display panel 71 disposed above the thin film transistor array panel 73, and liquid crystal (not illustrated) disposed therebetween. In this manner, the color filter display panel 71 may be disposed between the top chassis 60 and the thin film transistor array panel 73.

The backlight assembly 20 is fixed to the mold frame 22 and includes at least one LED 12, a light emitting diode power supply substrate 14, a light guide plate 16, a reflective sheet 26, and optical sheets 24.

The digitizer module 30 is disposed below the backlight assembly 20, that is, below the reflective sheet 26. In this manner, the backlight assembly 20 is disposed between the top chassis 60 and the digitizer module 30.

The digitizer module 30 includes a sensor board 28 configured to detect a position of a magnetic field generated in response to encroachment of the pen of an electromagnetic type and a supporting substrate 29 configured to supports the sensor board 28. In this manner, the sensor board 28 is disposed on the supporting substrate 29 and may be formed including a plurality of loop coils.

The supporting substrate 29 comprises a non-magnetic material, such as Al, a non-magnetic SUS, etc. To this end, the supporting substrate 29 may be configured to prevent (or otherwise reduce) electromagnetic interference with an inverter board (not shown) and a signal converting printed circuit board (not illustrated), which may be disposed below the digitizer module 30. As such, the digitizer module 30 may be disposed between the top chassis 60 and the inverter board and the signal converting printed circuit board.

A size of the supporting substrate 29 may be larger than the size of the sensor board 28. Further, the supporting substrate 29 may include first through fourth extending portions 29a, 29b, 29c, and 29d which extend in, for example, four directions. It is contemplated, however, that any suitable number of extending portions may be utilized and may extend in any suitable number of directions.

As seen in FIGS. 5-7, the LED power supply substrate 14 is disposed on the supporting substrate 29, as is the sensor board 28. In this manner, the supporting substrate 29 may be utilized to diffuse heat generated by the LED 12 and transferred to the supporting substrate 29.

According to exemplary embodiments, the extending portions 29a, 29b, 29c and 29d of the supporting substrate 29 are bent inside the mold frame 22 to be disposed between the backlight assembly 20 and the mold frame 22. In this manner, the extending portions 29a, 29b, 29c, and 29d of the supporting substrate 29 may be configured to fix (or otherwise support) the backlight assembly 20, e.g., the LED power supply substrate 14, the light guide plate 16, the reflective sheet 26, and the optical sheets 24. The mold frame 22 fixes (e.g., is coupled to) the extending portions 29a, 29b, 29c, and 29d of the supporting substrate 29 to fix the backlight assembly 20.

A top chassis 60 is disposed above the liquid crystal panel assembly 70 and is configured to protect and support the liquid crystal panel assembly 70. The top chassis 60 may be utilized to bend the flexible printed circuit substrate 79 to the outside of the mold frame 22, as seen in FIG. 7. To this end, the top chassis 60 may be configured to interface with the supporting substrate 29 to, for example, enclose the various components of the liquid crystal display device 100 therebetween. In exemplary embodiments, wherein respective lower surfaces of the top chassis 60, the mold frame 22, and the supporting substrate 29 may be substantially coplanar.

Although not illustrated, the liquid crystal display device 100 may include a touch screen panel disposed above the liquid crystal panel 75. The touch screen panel may be configured to facilitate detection of a capacitive touch pressure. Further, although not illustrated in FIGS. 5-7, an inverter board configured to serve as a power supplying printed circuit board and a signal converting printed circuit board may be disposed on a rear surface of the supporting substrate 29.

According to exemplary embodiments, the supporting substrate 29 is configured to support the LED power supply substrate 14 and the mold frame 22 so that a bottom chassis is not required. This may enable the reduction in thickness of the liquid crystal display device 100.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A liquid crystal display, comprising:
a liquid crystal panel configured to display an image;
a backlight assembly comprising:
a light emitting diode configured to provide light to the liquid crystal panel; and
a light guide plate configured to guide the light from the light emitting diode towards the liquid crystal panel; and
a digitizer module comprising a sensor board and a supporting substrate configured to support the sensor board, the backlight assembly being disposed between the liquid crystal panel and the supporting substrate,
wherein the sensor board is disposed on a first portion of the supporting substrate, and
wherein the light emitting diode is disposed on a second portion of the supporting substrate, the second portion being disposed outside the first portion.

2. The liquid crystal display of claim 1, wherein the supporting substrate comprises a non-magnetic material.

3. The liquid crystal display of claim 2, wherein the sensor board comprises loop coils configured to facilitate detection of electromagnetic signals.

4. The liquid crystal display of claim 3, wherein the backlight assembly further comprises:
a reflective sheet configured to reflect incident light towards the liquid crystal panel,
wherein the light guide is disposed on the reflective sheet.

5. The liquid crystal display of claim 4, wherein the reflective sheet is disposed on the sensor board.

6. The liquid crystal display of claim 5, further comprising:
a mold frame enclosing the backlight assembly,
wherein the mold frame comprises an open upper surface and an open lower surface.

7. The liquid crystal display of claim 6, wherein the mold frame is disposed on a third portion of the supporting substrate, the third portion being disposed outside the first and second portions.

8. The liquid crystal display of claim 6, wherein the supporting substrate further comprises extending portions longitudinally extending in different directions.

9. The liquid crystal display of claim 8, wherein the extending portions are bent inside the mold frame.

10. The liquid crystal display of claim 9, wherein the extending portions are disposed between the mold frame and the backlight assembly.

11. The liquid crystal display of claim 10, further comprising:
a top chassis,
wherein the backlight assembly is vertically disposed between the top chassis and the supporting substrate, and
wherein the mold frame is horizontally disposed between the top chassis and the extending portions.

12. The liquid crystal display of claim 11, wherein:
the liquid crystal panel comprises a flexible printed circuit substrate;
a first portion of the flexible printed circuit substrate is vertically disposed between the top chassis and the mold frame; and
a second portion of the flexible circuit board is bent from the first portion, the second portion being horizontally disposed between the top chassis and the mold frame.

13. A display device, comprising: a top chassis;
a mold frame;
a display panel configured to display an image, the display panel being vertically disposed between the mold frame and the top chassis; and
a digitizer module comprising: a sensor board configured to detect electromagnetic changes caused, at least in part, by encroachment of a resonance circuit; and
a supporting substrate configured to support the sensor board, wherein the display panel is vertically disposed between the supporting substrate and the top chassis,
wherein the mold frame is configured to: support at least a portion of the digitizer module therein; and interface with the top chassis, and
wherein the mold frame is horizontally disposed between the top chassis and the digitizer module; and the supporting substrate comprises extending portions bent from the supporting substrate, the extending portions extending towards the top chassis; and the mold frame is horizontally disposed between the extending portions and the top chassis.

14. The display device of claim 13, wherein the supporting substrate comprises a non-magnetic material.

15. The display device of claim 14, wherein the sensor board comprises loop coils configured to facilitate detection of the electromagnetic changes.

16. The display device of claim 13, further comprising:
a backlight assembly comprising:
  a light emitting diode configured to provide light to the display panel; and
  a light guide plate configured to guide light from the light emitting diode towards the display panel,
wherein the mold frame is configured to support the backlight assembly therein.

17. The display device of claim 16, wherein the light emitting diode is disposed on the supporting substrate.

18. The display device of claim 16, wherein respective lower surfaces of the top chassis, the mold frame, and the supporting substrate are substantially coplanar.

19. The display device of claim 13, wherein:
the display panel comprises a flexible printed circuit substrate;
a first portion of the flexible printed circuit substrate is vertically disposed between the top chassis and the mold frame; and
a second portion of the flexible circuit board is bent from the first portion, the second portion being horizontally disposed between the top chassis and the mold frame.

* * * * *